US010108474B2

(12) United States Patent
Beard

(10) Patent No.: US 10,108,474 B2
(45) Date of Patent: *Oct. 23, 2018

(54) TRACE CAPTURE OF SUCCESSFULLY COMPLETED TRANSACTIONS FOR TRACE DEBUGGING OF FAILED TRANSACTIONS

(71) Applicant: International Business Machines Corporation, Armonk, NY (US)

(72) Inventor: Darren R. Beard, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 146 days.

This patent is subject to a terminal disclaimer.

(21) Appl. No.: 15/162,616

(22) Filed: May 24, 2016

(65) Prior Publication Data

US 2016/0266961 A1 Sep. 15, 2016

Related U.S. Application Data

(60) Continuation of application No. 13/406,718, filed on Feb. 28, 2012, now Pat. No. 9,348,728, which is a division of application No. 13/171,857, filed on Jun. 29, 2011, now abandoned.

(51) Int. Cl.
*G06F 11/00* (2006.01)
*G06F 11/07* (2006.01)
*G06F 11/36* (2006.01)

(52) U.S. Cl.
CPC ...... *G06F 11/0778* (2013.01); *G06F 11/0709* (2013.01); *G06F 11/079* (2013.01); *G06F 11/0745* (2013.01); *G06F 11/0751* (2013.01); *G06F 11/0775* (2013.01); *G06F 11/366* (2013.01); *G06F 11/3636* (2013.01)

(58) Field of Classification Search
CPC .................................................. G06F 11/0778
USPC .... 714/15, 16, 18-20, 45, 46, 47, 47.1, 47.2
See application file for complete search history.

(56) References Cited

U.S. PATENT DOCUMENTS

| 7,555,679 B2 | 6/2009 | Cheston et al. |
| 7,577,679 B2* | 8/2009 | Sinclair ............. G06F 17/30315 |
| 8,073,806 B2* | 12/2011 | Garg ....................... H04L 12/66 |
| | | 706/45 |
| 2004/0078691 A1* | 4/2004 | Cirne ................... G06F 11/3624 |
| | | 714/38.13 |
| 2010/0228507 A1 | 9/2010 | Hosokawa et al. |
| 2011/0098973 A1* | 4/2011 | Seidman ............. G06F 11/0709 |
| | | 702/179 |

* cited by examiner

*Primary Examiner* — Dieu-Minh Le
(74) *Attorney, Agent, or Firm* — Steven M. Greenberg, Esq.; CRGO Law

(57) ABSTRACT

Embodiments of the present invention provide a method, system and computer program product for trace capture of successfully completed transactions for trace debugging of failed transactions. In an embodiment of the invention, a method for trace capture of successfully completed transactions for trace debugging of failed transactions is provided. The method includes storing entries in a log with information pertaining to successfully completed transactions in a transaction processing system executing in memory of a host server, detecting a failed transaction in the transaction processing system, generating a trace for the failed transaction, and providing with the generated trace an entry from the log with information pertaining to a successful completion of the failed transaction.

6 Claims, 1 Drawing Sheet

TRACE CAPTURE OF SUCCESSFULLY COMPLETED TRANSACTIONS FOR TRACE DEBUGGING OF FAILED TRANSACTIONS

CROSS-REFERENCE TO RELATED APPLICATIONS

This application is a Continuation of U.S. application Ser. No. 13/406,718, filed Feb. 28, 2012, which is a Divisional of U.S. application Ser. No. 13/171,857, filed Jul. 13, 2011, the entirety of which are incorporated herein by reference.

BACKGROUND OF THE INVENTION

Field of the Invention

The present invention relates to transaction debugging and more particularly to trace debugging of failed transactions in a transaction processing system.

Description of the Related Art

A transaction processing system is a type of information system that collects, stores, modifies, and retrieves organizational transactions. In this regard, a transaction is an event that generates or modifies data that is eventually stored in an information system. To be considered a transaction processing system the "ACID" test must be satisfied. In this regard, the "ACID" test refers to a test for atomicity, consistency, isolation, durability as a set of properties that guarantee database transactions are processed reliably.

The essence of a transaction processing system is that the data of the transaction processing system data must be left in a consistent state. That is to say, for a compound transaction, for the transaction to complete successfully, all portions of the transaction must complete successfully. Otherwise, any changes resulting from the partial completion of the transaction must be "rolled back" to the state that existed prior to the initiation of the compound transaction. While this type of integrity must be provided also for batch transaction processing, it is particularly important for real time processing. Other transaction monitor functions include deadlock detection and resolution resulting from cross-dependence on data, and transaction logging in trace logs for forward recovery in case of transaction failures requiring debugging.

A busy transaction processing system can process many millions of transactions each day. When a problem arises, end users often must resort to sophisticated vendor provided technical support to execute trace operations to capture trace log data with respect to a recognized failure. Consequently, a trace is captured and sent to technical support—typically by electronic means. The problem then becomes one of diagnosing what has gone wrong.

Of note, the trace is typically not large enough to span more than a very short time period, perhaps only a few seconds of clock time even for a large trace data set on a busy system. The transaction which caused the reported failure may be seen, but without a trace log that includes for comparison purposes, data from a previously successfully completed instance of the transaction, it can be very difficult to diagnose what has gone wrong. The absence of trace data for a previously successful completion of a failed transaction can make problem diagnosis difficult, resulting in unnecessary and burdensome interactions between the customer and technical support which can be irritating from the view of the customer and costly from the view of the vendor.

BRIEF SUMMARY OF THE INVENTION

Embodiments of the present invention address deficiencies of the art in respect to trace debugging of a transaction processing system and provide a novel and non-obvious method, system and computer program product for trace capture of successfully completed transactions for trace debugging of failed transactions. In an embodiment of the invention, a method for trace capture of successfully completed transactions for trace debugging of failed transactions is provided. The method includes storing entries in a log with information pertaining to successfully completed transactions in a transaction processing system executing in memory of a host server, detecting a failed transaction in the transaction processing system, generating a trace for the failed transaction, and providing with the generated trace an entry from the log with information pertaining to a successful completion of the failed transaction.

In another embodiment of the invention, a transaction data processing system is provided. The system includes a host server with memory and at least one process and a transaction processing system executing in the memory of the host server. The system also includes a trace generation component coupled to the transaction processing system. In this regard, the component generates a trace for a failed transaction in the transaction processing system. Finally, the system includes a transaction logging module coupled to the transaction processing system. The module includes program code enabled to store entries in a log with information pertaining to successfully completed transactions in the transaction processing system, and to provide with the generated trace an entry from the log with information pertaining to a successful completion of the failed transaction.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for trace capture of successfully completed transactions for trace debugging of failed transactions. In accordance with an embodiment of the invention, successfully completed transactions in a transaction processing system can be placed in a log. In particular, information about events in a successfully completed process including the calling of and return from functions, the exit of processes and other significant occurrences in the execution of a program can be logged. Thereafter, upon the generation of trace for a failed transaction, information from the log pertaining to successful completion of the failed transaction can be integrated with the trace.

Figure 1:
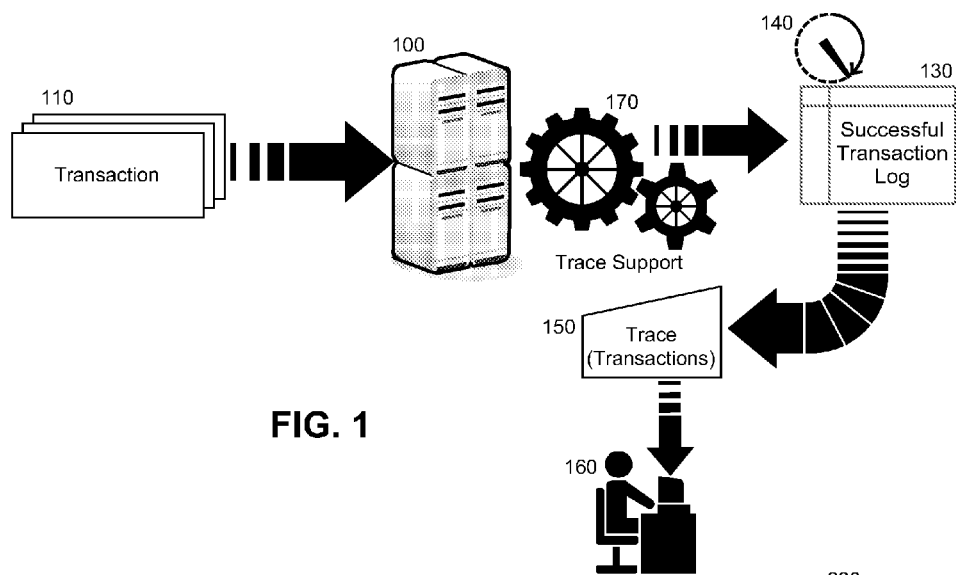
FIG. 1 is a pictorial illustration of a process for trace capture of successfully completed transactions for trace debugging of failed transactions.

In further illustration, FIG. 1 pictorially shows a process for trace capture of successfully completed transactions for trace debugging of failed transactions. As shown in FIG. 1, a transaction processing system 100 can process different transactions 110. In response to detecting successfully completed ones of the transactions 110, trace support 170 can add an entry in a successful transaction log 130 for each successfully completing one of the transactions 110 so long as an entry that is not stale according to a timer 140 does not already exist in the log 130 for the completed ones of the transactions 110. Thereafter, upon initiating a trace 150 in response to detecting a failed one of the transactions 110, the trace 150 can be provided to a debugging end user 160 including an entry from the log 130 for a successfully completed instance of the failed one of the transactions 110.

Figure 2:
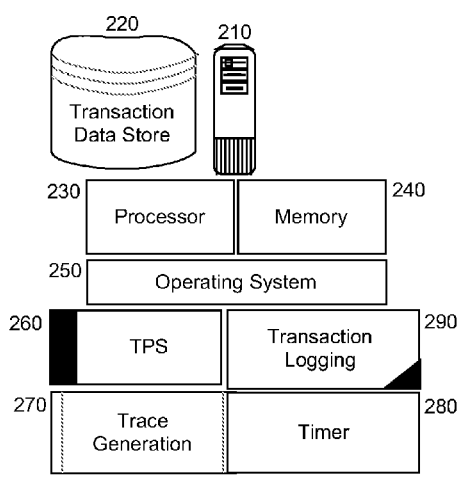
FIG. 2 is a schematic illustration of a transaction data processing system configured for trace capture of successfully completed transactions for trace debugging of failed transactions; and, FIG. 3 is a flow chart illustrating a process for trace capture of successfully completed transactions for trace debugging of failed transactions.

The process described in connection with FIG. 1 can be implemented in a transaction data processing system. In yet further illustration, FIG. 2 schematically shows a transaction data processing system configured for trace capture of successfully completed transactions for trace debugging of failed transactions. The system can include a host server 210 with at least one processor 230 and memory 240 supporting the execution of an operating system 250. The operating system can support the operation of a transaction processing system 260 processing different transactions. Additionally, a trace generation component 270 can be coupled to the transaction processing system 260 and can be configured to generate a trace for trace debugging responsive to a failed completion of a transaction.

Of note, transaction logging module 290 can be coupled to the transaction processing system 260. The transaction logging module 290 can include program code enabled upon execution in the memory 240 of the host server 210 to log in transaction data store 220 information pertaining to successful successfully completed transactions in the transaction processing system 260. In particular, the information can include events in a successfully completed process such as the calling of and return from functions, the exit of processes and other significant occurrences in the execution of a program can be logged. The program code of the transaction logging module 290 further can be enabled to ensure only a single non-stale entry for each successfully completed transaction in reference to a timer 280. Finally, the program code of the transaction logging module 290 can be enabled upon the generation of trace for a failed transaction by trace generation component 270, to include in the trace information from the log pertaining to the successful completion of the failed transaction.

Figure 3:
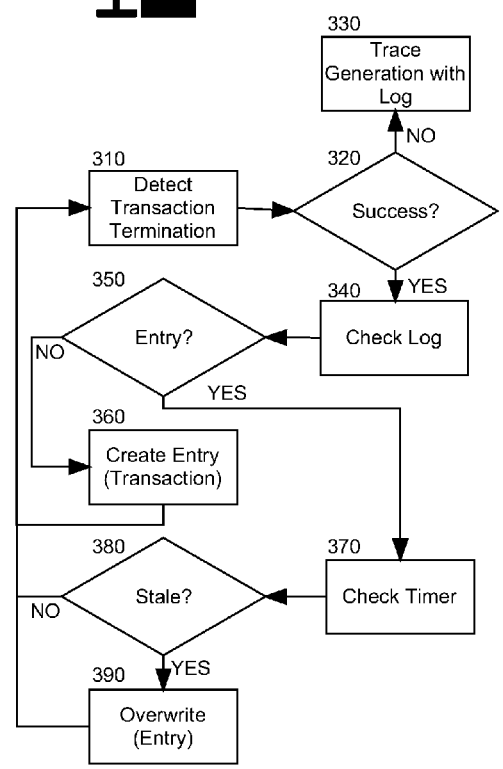

In yet further illustration of the operation of the transaction logging module 290, FIG. 3 is a flow chart illustrating a process for trace capture of successfully completed transactions for trace debugging of failed transactions. Beginning in block 310, a termination of a transaction can be detected and in decision block 320, it can be determined whether or not the transaction completed successfully. If so, in block 340, a log of successfully completed transactions can be consulted to determine in decision block 350 whether or not an entry presently exists in the log for the successfully completed transaction. If not, in block 360 a new entry can be created in the transaction log for the successfully completed transaction. The entry can include, by way of example, information for events occurring during the execution of the successfully completed transaction.

In decision block 350, if it is determined that an entry already exists in the log for the successfully completed transaction, in block 370 a timer or clock can be consulted to determine whether or not a threshold period of time has elapsed since the existing entry had been placed in the log. In decision block 380, of a threshold period of time has elapsed since the existing entry had been placed in the log, in block 390, the existing entry can be overwritten with a new entry. Thereafter, the process can repeat in block 310 with the detection of the termination of a new transaction. Finally, in decision block 320, if it is determined that a terminated transaction has failed to complete successfully, in block 330, a trace can be generated for the failed transaction along with a corresponding entry in the log of an instance of a successful completion of the failed transaction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A transaction data processing system comprising:
a host server with memory and at least one processor;
a transaction processing system executing in the memory of the host server;
a trace generation component coupled to the transaction processing system, the component generating a trace for a failed transaction in the transaction processing system; and,
a transaction logging module coupled to the transaction processing system, the module comprising program code enabled to store entries in a log with information pertaining to successfully completed transactions in the transaction processing system, to detect a failed transaction in the transaction processing system, to generate a trace for the failed transaction and to provide with the generated trace an entry from the log with information pertaining to a previous successful completion of the failed transaction;
wherein the program code of the module in storing entries in a log with information pertaining to successfully completed transactions, detects a successfully completed transaction, determines if an entry already exists in the log for the successfully completed transaction, and in response to determining that an entry already exists in the log, overwrites the entry only if the entry has been in the log for a threshold period of time and is considered stale, but otherwise not overwriting the entry.

2. The system of claim 1, wherein the log contains only a single entry for each successfully completed transaction.

3. The system of claim 1, wherein the program code of the module is further enabled to overwrite stale entries in the log for corresponding successfully completed transactions with non-stale entries.

4. A computer program product for trace capture of successfully completed transactions for trace debugging of failed transactions, the computer program product comprising:
- a non-transitory computer readable storage medium having computer readable program code embodied therewith, the computer readable program code comprising:
- computer readable program code for storing entries in a log with information pertaining to successfully completed transactions in a transaction processing system executing in memory of a host server;
- computer readable program code for detecting a failed transaction in the transaction processing system;
- computer readable program code for generating a trace for the failed transaction; and,
- computer readable program code for providing with the generated trace an entry from the log with information pertaining to a previous successful completion of the failed transaction;
- wherein the computer readable program code for storing entries in a log with information pertaining to successfully completed transactions in a transaction processing system executing in memory of a host server, comprises:
- computer readable program code for detecting a successfully completed transaction;
- computer readable program code for determining if an entry already exists in the log for the successfully completed transaction; and,
- computer readable program code for responding to determining that an entry already exists in the log, by overwriting the entry only if the entry has been in the log for a threshold period of time and is considered stale, but otherwise not overwriting the entry.

5. The computer program product of claim 4, wherein the log contains only a single entry for each successfully completed transaction.

6. The computer program product of claim 4, further comprising computer readable program code for overwriting stale entries in the log for corresponding successfully completed transactions with non-stale entries.

\* \* \* \* \*